United States Patent
Zhang et al.

(10) Patent No.: US 11,532,854 B2
(45) Date of Patent: *Dec. 20, 2022

(54) BATTERY SEPARATOR INCLUDING MICROPOROUS POLYOLEFIN MEMBRANE WITH CERAMIC COATING

(71) Applicant: Celgard LLC, Charlotte, NC (US)

(72) Inventors: Zhengming Zhang, Rock Hill, SC (US); Xuefa Li, Matthews, NC (US); Lie Shi, Matthews, NC (US); Premanand Ramadass, Charlotte, NC (US); Paul M. Halmo, Denver, NC (US); Xiaomin Zhang, Charlotte, NC (US)

(73) Assignee: Celgard, LLC, Charlotte, NC (US)

( * ) Notice: Subject to any disclaimer, the term of this patent is extended or adjusted under 35 U.S.C. 154(b) by 265 days.

This patent is subject to a terminal disclaimer.

(21) Appl. No.: 16/785,726

(22) Filed: Feb. 10, 2020

(65) Prior Publication Data
US 2020/0176744 A1    Jun. 4, 2020

Related U.S. Application Data

(62) Division of application No. 13/960,924, filed on Aug. 7, 2013, now Pat. No. 10,559,802.

(60) Provisional application No. 61/680,550, filed on Aug. 7, 2012.

(51) Int. Cl.
| | |
|---|---|
| *H01M 50/449* | (2021.01) |
| *H01M 10/052* | (2010.01) |
| *H01M 50/403* | (2021.01) |
| *H01M 50/411* | (2021.01) |
| *H01M 50/431* | (2021.01) |

(52) U.S. Cl.
CPC ........ *H01M 50/449* (2021.01); *H01M 10/052* (2013.01); *H01M 50/403* (2021.01); *H01M 50/411* (2021.01); *H01M 50/431* (2021.01)

(58) Field of Classification Search
CPC ............ H01M 50/449; H01M 50/403; H01M 50/431; H01M 50/411
USPC ........................................ 429/144, 251, 254
See application file for complete search history.

(56) References Cited

U.S. PATENT DOCUMENTS

| | | |
|---|---|---|
| 6,432,586 B1 | 8/2002 | Zhang |
| 2008/0138700 A1 | 6/2008 | Horpel et al. |
| 2009/0092900 A1 | 4/2009 | Obana et al. |

(Continued)

FOREIGN PATENT DOCUMENTS

| | | | |
|---|---|---|---|
| JP | 2010240936 A | * | 10/2010 |
| JP | 2010240936 A | | 10/2010 |

(Continued)

OTHER PUBLICATIONS

Arora, Pankaj, and Zhengming Zhang, "Battery Separators." Chemical Review 104.10 (2004); pp. 4419-4472. (Year: 2004).

*Primary Examiner* — Sean P Cullen
(74) *Attorney, Agent, or Firm* — Hammer & Associates, P.C.

(57) ABSTRACT

A ceramic-coated battery separator having a microporous polyolefin membrane and a ceramic coating on at least one surface of the microporous polyolefin membrane, wherein the ceramic-coated separator exhibits a strain shrinkage of 0% at temperatures greater than or equal to 120 degrees Celsius is provided.

12 Claims, 4 Drawing Sheets

(56) References Cited

U.S. PATENT DOCUMENTS

| | | | |
|---|---|---|---|
| 2009/0117453 A1* | 5/2009 | Kikuchi | H01M 50/411 |
| | | | 429/145 |
| 2011/0027658 A1 | 2/2011 | Kim et al. | |
| 2011/0052987 A1* | 3/2011 | Katayama | H01M 50/411 |
| | | | 429/221 |
| 2011/0081594 A1* | 4/2011 | Han | H01M 50/44 |
| | | | 429/479 |
| 2011/0200863 A1 | 8/2011 | Xiso et al. | |
| 2011/0274961 A1* | 11/2011 | Takita | H01M 50/491 |
| | | | 429/249 |
| 2012/0003546 A1 | 1/2012 | Han et al. | |
| 2012/0090758 A1* | 4/2012 | Lee | H01M 50/449 |
| | | | 156/60 |
| 2013/0101886 A1 | 4/2013 | Jung et al. | |
| 2013/0115484 A1 | 5/2013 | Li et al. | |
| 2013/0189587 A1* | 7/2013 | Kikuchi | H01M 50/411 |
| | | | 429/246 |
| 2015/0263325 A1* | 9/2015 | Honda | H01M 50/457 |
| | | | 429/144 |
| 2015/0380705 A1* | 12/2015 | Lee | H01M 50/491 |
| | | | 429/254 |

FOREIGN PATENT DOCUMENTS

| | | | | |
|---|---|---|---|---|
| KR | 20070000231 A | | 1/2007 | |
| KR | 20110097714 A | * | 8/2011 | H01M 50/411 |
| WO | 2008149986 A1 | | 12/2008 | |

* cited by examiner

BATTERY SEPARATOR INCLUDING MICROPOROUS POLYOLEFIN MEMBRANE WITH CERAMIC COATING

CROSS REFERENCE TO RELATED APPLICATIONS

This application is a Divisional application to U.S. application Ser. No. 13/960,924, filed Aug. 7, 2013; which claims priority to and the benefit of U.S. provisional patent application Ser. No. 61/680,550 filed Aug. 7, 2012 which is fully incorporated by reference herein.

FIELD OF THE INVENTION

The present invention is directed to improved, new or modified membranes, separators, and/or related methods. In accordance with at least certain embodiments, the present invention is directed to improved, new or modified nonporous, porous, or microporous battery separator membranes or separators and/or related methods of manufacture and/or use of such membranes or separators. In accordance with at least selected embodiments, the present invention is directed to improved, new or modified nonporous, porous, or microporous battery separator membranes or separators for lithium ion batteries and/or related methods of manufacture and/or use of such membranes or separators. In accordance with at least selected particular embodiments, the present invention is directed to improved, new or modified nonporous, porous, or microporous battery separator membranes or separators for secondary or rechargeable lithium ion batteries and/or related methods of manufacture and/or use of such membranes or separators. In accordance with at least certain selected particular embodiments, the present invention is directed to nonporous, porous, or microporous coated porous or microporous battery separator membranes or separators for secondary lithium ion batteries and/or related methods of manufacture and/or use of such membranes or separators. In accordance with at least one embodiment, an improved, new or modified nonporous, porous, or microporous membrane, separator membrane or separator for a lithium ion battery includes a porous or microporous membrane coated with a ceramic coating or layer such as a layer of one or more particles and/or binders. In accordance with at least one particular embodiment, an improved, new or modified nonporous, porous, or microporous membrane, separator membrane or separator for a secondary lithium ion battery includes a microporous membrane coated with at least one porous ceramic coating or layer such as a layer of one or more ceramic particles and polymeric binders. In accordance with at least selected embodiments, the inventive ceramic coated separator membrane or separator preferably provides improved safety, cycle life and/or high temperature performance in a secondary lithium ion battery.

SUMMARY OF THE INVENTION

In accordance with at least selected embodiments, objects or aspects of the present invention, there is provided improved, new or modified membranes, separators, and/or related methods. In accordance with at least certain embodiments, the present invention is directed to improved, new or modified nonporous, porous, or microporous battery separator membranes or separators and/or related methods of manufacture and/or use of such membranes or separators. In accordance with at least selected embodiments, the present invention is directed to improved, new or modified nonporous, porous, or microporous battery separator membranes or separators for lithium ion batteries and/or related methods of manufacture and/or use of such membranes or separators. In accordance with at least selected particular embodiments, the present invention is directed to improved, new or modified nonporous, porous, or microporous battery separator membranes or separators for secondary or rechargeable lithium ion batteries and/or related methods of manufacture and/or use of such membranes or separators. In accordance with at least certain selected particular embodiments, the present invention is directed to nonporous, porous, or microporous coated porous or microporous battery separator membranes or separators for secondary lithium ion batteries and/or related methods of manufacture and/or use of such membranes or separators. In accordance with at least one embodiment, an improved, new or modified nonporous, porous, or microporous membrane, separator membrane or separator for a lithium ion battery includes a porous or microporous membrane coated with a ceramic coating or layer such as a layer of one or more particles and/or binders. In accordance with at least one particular embodiment, an improved, new or modified nonporous, porous, or microporous membrane, separator membrane or separator for a secondary lithium ion battery includes a microporous membrane coated with at least one porous ceramic coating or layer such as a layer of one or more ceramic particles and polymeric binders. In accordance with at least selected embodiments, the inventive ceramic coated separator membrane or separator preferably provides improved safety, cycle life and/or high temperature performance in a secondary lithium ion battery.

In accordance with at least selected embodiments, the present invention is directed to improved, new or modified microporous membranes, separators, and/or related methods. In accordance with at least certain embodiments, the present invention is directed to improved, new or modified microporous battery separator membranes or separators and/or related methods of manufacture and/or use of such membranes or separators. In accordance with at least selected certain embodiments, the present invention is directed to improved, new or modified microporous battery separator membranes or separators for lithium ion batteries and/or related methods of manufacture and/or use of such membranes or separators. In accordance with at least selected particular embodiments, the present invention is directed to improved, new or modified microporous battery separator membranes or separators for secondary or rechargeable lithium ion batteries and/or related methods of manufacture and/or use of such membranes or separators. In accordance with at least certain selected particular embodiments, the present invention is directed to coated microporous battery separator membranes or separators for secondary lithium ion batteries and/or related methods of manufacture and/or use of such membranes or separators. In accordance with at least one embodiment, an improved, new or modified microporous membrane, separator membrane or separator for a lithium ion battery includes a microporous membrane coated with at least one coating, particle coating, and/or ceramic coating or layer such as a layer of one or more particles, ceramics, polymers and/or binders. In accordance with at least one particular embodiment, an improved, new or modified microporous membrane, separator membrane or separator for a secondary lithium ion battery includes a microporous membrane coated with at least one porous ceramic coating or layer such as a layer of one or more ceramic particles and polymeric binders. In accordance with at least selected embodiments, the inventive ceramic coated microporous separator membrane preferably provides improved safety, cycle life and/or high temperature performance in a secondary lithium ion battery.

In accordance with at least one embodiment, an improved, new or modified membrane, separator membrane or separator for a lithium ion battery includes a microporous membrane coated with a material, particle coating, and/or ceramic coating or layer such as layer of one or more types of ceramic particles and at least one polymeric binder. In accordance with at least selected embodiments, the inventive ceramic coated separator membrane preferably provides improved safety, cycle life and/or high temperature performance in a secondary lithium ion battery. The improvement in the safety, cycle life and/or high temperature performance of the coated and/or ceramic coated separator membrane is believed mainly due to the coating or ceramic coating or layer undergoing an oxidation or reduction reaction at the interface of the coated separator and electrodes in a lithium ion battery. The formation of an oxidized or reduced interfacial layer between a separator and a battery electrode prevents or stops further oxidation or reduction reactions from occurring and improves the safety, cycle life and/or the high temperature performance of a lithium ion battery. In addition, the safety, cycle life and high temperature performance of the coated and/or ceramic coated separator membrane is improved due to its high dimensional stability at elevated temperatures. Furthermore, in at least certain embodiments, this unique inventive ceramic coated microporous separator membrane preferably evolves >2% volatile components at ≥250 deg C.

In accordance with at least selected embodiments, the present invention preferably provides a coated separator membrane for a secondary lithium ion battery which is preferably made up of a microporous polyolefin substrate coated on at least one side with a coating, particle coating, and/or ceramic coating or layer of one or more polymers or binders, particles, and/or ceramic particles and at least one polymeric binder. These selected embodiments further provide a process for producing a separator according to the present invention, the use of an inventive separator in a secondary lithium ion battery, and the like. These selected embodiments, also provide an inventive separator that preferably has the advantage of improved safety, cycle life, and/or high temperature performance when used in a lithium ion battery. This improved, new or modified membrane, membrane separator or separator for a lithium ion battery is preferably coated on at least one side with a mixture of a ceramic particle or particles and one or more aqueous or water based polymeric binders. The aqueous or water based binder contained in the ceramic coating or layer may undergo an oxidation or reduction reaction at the interface of the coated separator and electrodes in a lithium ion battery. Oxidation or reduction reactions can occur during the formation stage of a lithium ion battery or during the charging and/or discharging stage of a lithium ion battery. The oxidized or reduced interfacial layer may provide a barrier or sacrificial interfacial layer on the surface of the coated separator that can prevent or stop further oxidation or reduction reactions from occurring at the interface and improve the performance or cycle life of a lithium ion battery.

The nonporous, porous or microporous coating, particle coating, and/or ceramic coating can be applied to a porous, macroporous or microporous membrane, film or separator membrane as a single or multiple layer coating or layer structure and as a single or double side coating. At least selected embodiments of the present invention comprise a single or double side coating or ceramic coating that is about 1-12 µm thick or more, preferably about 2-12 µm thick, more preferably about 3-10 µm thick, and most preferably about 3-7 µm thick. Selected embodiments of the present invention may preferably be distinguished from prior coated or ceramic coated battery separators in at least one of five ways: 1) the inventive ceramic coated microporous membrane has a Machine Direction (MD) shrinkage of <2% at 120 deg C. for one hour when tested in free state and a MD shrinkage of <3% at 130 deg C. for one hour when tested in free state, 2) the inventive ceramic coated microporous membrane has a MD shrinkage of <1% at 150 deg C. when tested using Thermomechanical Analysis (TMA), 3) the inventive ceramic coated microporous membrane has a transverse direction (TD) shrinkage <1% at 150 deg C. when tested using e-TMA, 4) the inventive ceramic coated microporous membrane evolves >2% volatile components at 250 deg C. when tested using Thermogravimetric Analysis (TGA), and/or 5) the coating results in a low increase in Gurley for the inventive ceramic coated microporous membrane.

Figure 1:
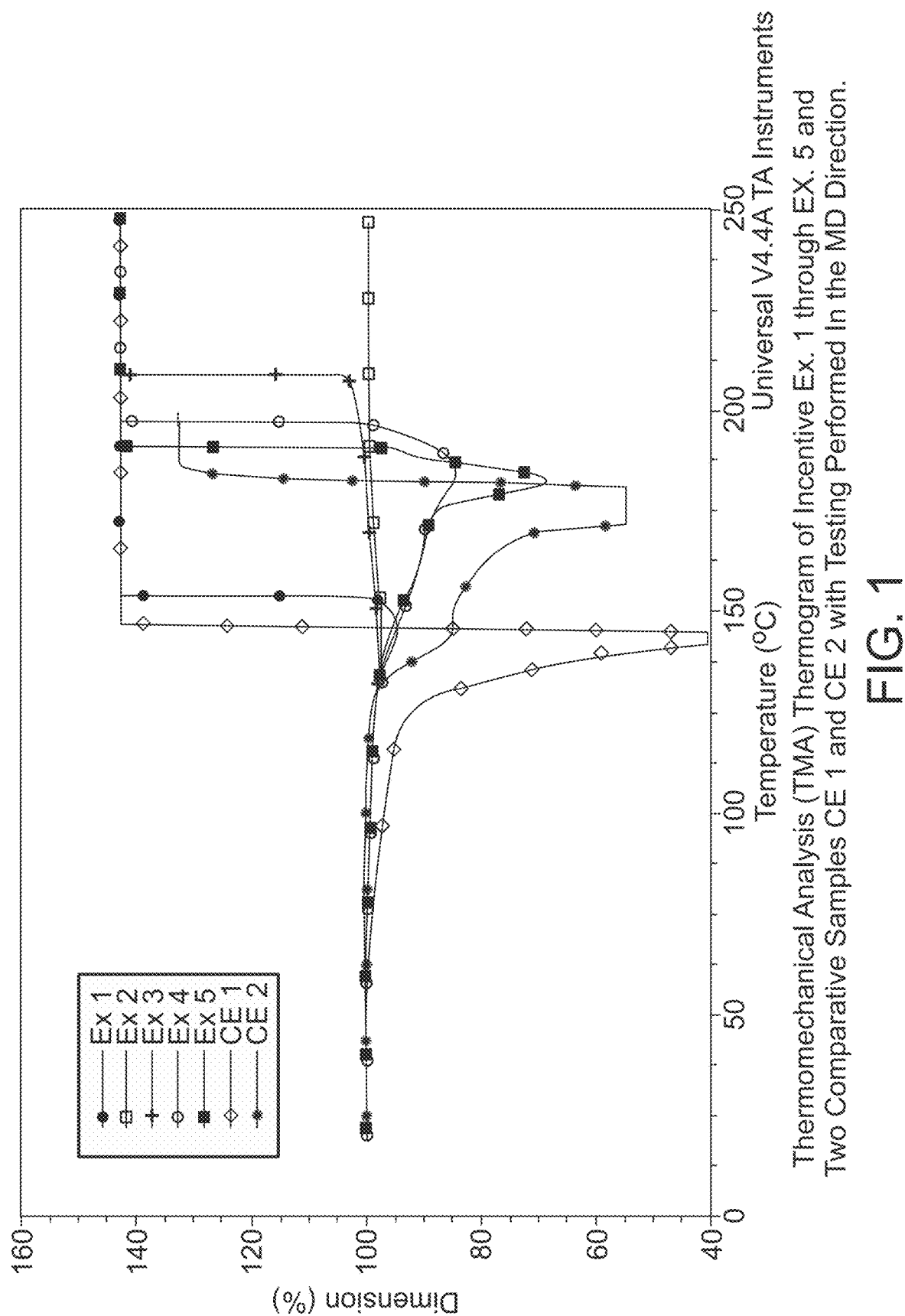
FIG. 1 is a Thermomechanical Analysis (TMA) thermogram representation of Inventive Examples Ex 1 through Ex 5 and two comparative samples CE 1 and CE 2 with testing performed in the Machine Direction (MD) of the membranes.

Various examples, embodiments or aspects of the invention are shown in the drawings. It should be recognized that these figures are merely illustrative of the principles of the present invention. Numerous additional embodiments, examples, modifications, and adaptations thereof will be described below and are readily apparent to those skilled in the art without departing from the spirit and scope of the invention.

DETAILED DESCRIPTION OF THE INVENTION

In accordance with at least selected embodiments, objects or aspects of the present invention, there is provided improved, new or modified membranes, separators, and/or related methods. In accordance with at least certain embodiments, the present invention is directed to improved, new or modified nonporous, porous, or microporous battery separator membranes or separators and/or related methods of manufacture and/or use of such membranes or separators. In accordance with at least selected embodiments, the present invention is directed to improved, new or modified nonporous, porous, or microporous battery separator membranes or separators for lithium ion batteries and/or related methods of manufacture and/or use of such membranes or separators. In accordance with at least selected particular embodiments, the present invention is directed to improved, new or modified nonporous, porous, or microporous battery separator membranes or separators for secondary or rechargeable lithium ion batteries and/or related methods of manufacture and/or use of such membranes or separators. In accordance with at least certain selected particular embodiments, the present invention is directed to nonporous, porous, or microporous coated porous or microporous battery separator membranes or separators for secondary lithium ion batteries and/or related methods of manufacture and/or use of such membranes or separators. In accordance with at least one embodiment, an improved, new or modified nonporous, porous, or microporous membrane, separator membrane or separator for a lithium ion battery includes a porous or microporous membrane coated with a ceramic coating or layer such as a layer of one or more particles and/or binders. In accordance with at least one particular embodiment, an improved, new or modified nonporous, porous, or microporous membrane, separator membrane or separator for a secondary lithium ion battery includes a microporous membrane coated with at least one porous ceramic coating or layer such as a layer of one or more ceramic particles and polymeric binders. In accordance with at least selected embodiments, the inventive ceramic coated separator membrane or separator preferably provides improved safety, cycle life and/or high temperature performance in a secondary lithium ion battery.

In accordance with at least selected embodiments, the present invention is directed to improved, new or modified microporous membranes, separators, and/or related methods. In accordance with at least certain embodiments, the present invention is directed to improved, new or modified microporous battery separator membranes or separators and/or related methods of manufacture and/or use of such membranes or separators. In accordance with at least selected certain embodiments, the present invention is directed to improved, new or modified microporous battery separator membranes or separators for lithium ion batteries and/or related methods of manufacture and/or use of such membranes or separators. In accordance with at least selected particular embodiments, the present invention is directed to improved, new or modified microporous battery separator membranes or separators for secondary or rechargeable lithium ion batteries and/or related methods of manufacture and/or use of such membranes or separators. In accordance with at least certain selected particular embodiments, the present invention is directed to coated microporous battery separator membranes or separators for secondary lithium ion batteries and/or related methods of manufacture and/or use of such membranes or separators. In accordance with at least one embodiment, an improved, new or modified microporous membrane, separator membrane or separator for a lithium ion battery includes a microporous membrane coated with at least one coating, particle coating, and/or ceramic coating or layer such as a layer of one or more particles, ceramics, polymers and/or binders. In accordance with at least one particular embodiment, an improved, new or modified microporous membrane, separator membrane or separator for a secondary lithium ion battery includes a microporous membrane coated with at least one porous ceramic coating or layer such as a layer of one or more ceramic particles and polymeric binders. In accordance with at least selected embodiments, the inventive ceramic coated microporous separator membrane preferably provides improved safety, cycle life and/or high temperature performance in a secondary lithium ion battery.

In accordance with at least one embodiment, an improved, new or modified membrane, separator membrane or separator for a lithium ion battery includes a microporous membrane coated with a material, particle coating, and/or ceramic coating or layer such as layer of one or more types of ceramic particles and at least one polymeric binder. In accordance with at least selected embodiments, the inventive ceramic coated separator membrane preferably provides improved safety, cycle life and/or high temperature performance in a secondary lithium ion battery. The improvement in the safety, cycle life and/or high temperature performance of the coated and/or ceramic coated separator membrane is believed mainly due to the coating or ceramic coating or layer undergoing an oxidation or reduction reaction at the interface of the coated separator and electrodes in a lithium ion battery. The formation of an oxidized or reduced interfacial layer between a separator and a battery electrode prevents or stops further oxidation or reduction reactions from occurring and improves the safety, cycle life and/or the high temperature performance of a lithium ion battery. In addition, the safety, cycle life and high temperature performance of the coated and/or ceramic coated separator membrane is improved due to its high dimensional stability at elevated temperatures. Furthermore, in at least certain embodiments, this unique inventive ceramic coated microporous separator membrane preferably evolves >2% volatile components at ≥250 deg C.

In accordance with at least selected embodiments, the present invention preferably provides a coated separator membrane for a secondary lithium ion battery which is preferably made up of a microporous polyolefin substrate coated on at least one side with a coating, particle coating, and/or ceramic coating or layer of one or more polymers or binders, particles, and/or ceramic particles and at least one polymeric binder. These selected embodiments further provide a process for producing a separator according to the present invention, the use of an inventive separator in a secondary lithium ion battery, and the like. These selected embodiments, also provide an inventive separator that preferably has the advantage of improved safety, cycle life, and/or high temperature performance when used in a lithium ion battery. This improved, new or modified membrane, membrane separator or separator for a lithium ion battery is preferably coated on at least one side with a mixture of a ceramic particle or particles and one or more aqueous or water based polymeric binders. The aqueous or water based binder contained in the ceramic coating or layer may undergo an oxidation or reduction reaction at the interface of the coated separator and electrodes in a lithium ion battery. Oxidation or reduction reactions can occur during the formation stage of a lithium ion battery or during the charging and/or discharging stage of a lithium ion battery. The oxidized or reduced interfacial layer may provide a barrier or sacrificial interfacial layer on the surface of the coated separator that can prevent or stop further oxidation or reduction reactions from occurring at the interface and improve the performance or cycle life of a lithium ion battery.

The nonporous, porous or microporous coating, particle coating, and/or ceramic coating can be applied to a porous, macroporous or microporous membrane, film or separator membrane as a single or multiple layer coating or layer structure and as a single or double side coating. At least selected embodiments of the present invention comprise a single or double side coating or ceramic coating that is about 1-12 µm thick or more, preferably about 2-12 µm thick, more preferably about 3-10 µm thick, and most preferably about 3-7 µm thick. Selected embodiments of the present invention may preferably be distinguished from prior coated or ceramic coated battery separators in at least one of five ways: 1) the inventive ceramic coated microporous membrane has a Machine Direction (MD) shrinkage of <2% at 120 deg C. for one hour when tested in free state and a MD shrinkage of <3% at 130 deg C. for one hour when tested in free state, 2) the inventive ceramic coated microporous membrane has a MD shrinkage of <1% at 150 deg C. when tested using Thermomechanical Analysis (TMA), 3) the inventive ceramic coated microporous membrane has a transverse direction (TD) shrinkage <1% at 150 deg C. when tested using e-TMA, 4) the inventive ceramic coated microporous membrane evolves >2% volatile components at 250 deg C. when tested using Thermogravimetric Analysis (TGA), and/or 5) the coating results in a low increase in Gurley for the inventive ceramic coated microporous membrane.

The present invention is preferably directed to improved, new or modified battery separators, and/or related methods. In accordance with at least certain embodiments, the present invention is directed to improved, new or modified nonporous, porous or microporous battery separators and/or related methods of manufacture and/or use of such separators. In accordance with at least selected embodiments, the present invention is directed to improved, new or modified coated, particle coated or ceramic coated battery separators for lithium ion batteries and/or related methods of manufacture and/or use of such separators. In accordance with at least selected particular embodiments, the present invention is directed to improved, new or modified coated, particle coated or ceramic coated battery separators for secondary or rechargeable lithium ion batteries and/or related methods of manufacture and/or use of such separators. In accordance with at least certain selected particular embodiments, the present invention is directed to coated battery separators including a microporous membrane, film or separator with a coating on at least one side thereof and/or related methods of manufacture and/or use of such separators. In accordance with at least one embodiment, an improved, new or modified coated separator for a lithium ion battery includes a microporous membrane coated with a ceramic coating or layer such as porous or nonporous layer of ceramic particles and at least one polymeric binder. In accordance with at least selected embodiments, the inventive ceramic coated separator preferably provides improved safety, cycle life and/or high temperature performance in a secondary lithium ion battery.

Figures 4, 5:
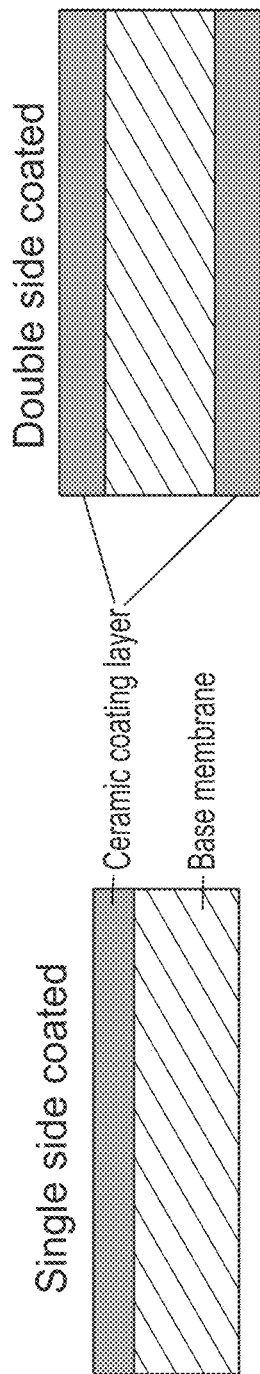
FIG. 4 is a schematic cross-section illustration of a single side coated membrane, separator membrane or separator.
FIG. 5 is a schematic cross-section illustration of a double side coated membrane, separator membrane or separator.

In accordance with selected embodiments, the coating, particle coating or ceramic coating may be present on one or both sides of the membrane, film, separator membrane or separator. FIGS. 4 and 5 show respective single sided or single side coated and double sided or double side coated embodiments. It should be noted that in FIGS. 4 and 5 that the coatings may be polymer, particle or ceramic coatings, that the coatings may be porous or non-porous, and that in the double side coated embodiment of FIG. 5 that the coating may be the same or different on each side. For example, although two ceramic coatings are shown, it is understood that one side may be a particle-free coating (such as PVDF), a particle coating (such as polymer particles in a binder), or a ceramic coating (such as ceramic particles in a binder or polymeric binder) and the other side may be the same or a different coating, particle coating, or ceramic coating. One side may be adapted to contact the cathode while the other side may be adapted to contact the anode. For instance, one side may be PVDF coated while the other side is ceramic coated with a mixture of a one or more ceramic particles combined with one or more polymeric binders such as PP, PE, PO, PVDF or PTFE.

The preferred membrane, film, base layer, membrane separator or separator may be a microporous polyolefin (PO) substrate that can be made by a dry process (also know as the CELGARD process), wet process, particle stretch process, BOPP process, BNBOPP process, or the like. The dry process refers to a process where the pore formation in a microporous membrane results from uniaxial or biaxial stretching of a nonporous precursor membrane (annular or slot die extrusion). The wet process typically involves a thermally induced phase separation process and a solvent extraction step (or TIPS process). The membrane, film, base layer, separator membrane or separator may preferably be a single layer (monolayer) or a multilayer (such as bi-layer or tri-layer or other multi-layer) microporous polyolefin membrane having or consisting of two or more layers of the same or dissimilar polyolefins. Exemplary polyolefins include, but are not limited to, polypropylene (PP), polyethylene (PE), polymethyl pentene (PMP) copolymers of any of the foregoing and mixtures thereof. The preferred microporous polyolefin substrate has a thickness ranging from about 1-100 µm, preferably about 4-50 µm, more preferably about 6-30 µm, and most preferably 8-20 µm. The preferred membranes are Celgard® brand membranes available from Celgard, LLC of Charlotte, N.C.

The ceramic coating is preferably made up of, includes or is comprised of one or more ceramic particles or materials mixed with one or more aqueous or water based binders, polymers, polymeric binders, or the like. The ceramic particles may be inorganic or organic, preferably inorganic. Non-limiting exemplary examples of inorganic particles are oxides of silicon ($SiO_2$), alumina ($Al_2O_3$), zirconium, titanium ($TiO_2$) or zinc or mixtures thereof or carbonates of silicon, alumina, zirconium, calcium, zinc, and blends or mixtures thereof. A preferred particle is $Al_2O_3$. The inorganic particles may have an average particle size ranging from 0.05 to 5 µm in diameter, more preferably 0.01 to 4 µm in diameter and most preferably 0.01 to 2 µm in diameter. The ceramic particles are preferably adapted to keep the electrodes spaced apart or separated at high temperatures given sufficient loading of particles and coating thickness or add.

The particle coating is preferably made up of, includes or is comprised of one or more particles or materials mixed with one or more aqueous or water based binders, polymeric binders, polymers, or the like. The particles may be inorganic or organic, preferably organic. Non-limiting exemplary examples of organic particles are polymer materials or particles, such as polymer fibers, beads, chips, or the like. Preferred polymers may include PP, PE, PO, PP/PE, PET, PTFE, PVDF, copolymers, block copolymers, or blends or mixtures thereof. A preferred particle is PO, PVDF or PET. The organic particles may have an average particle size ranging from 0.05 to 5 µm in diameter, more preferably 0.01 to 4 µm in diameter, and most preferably 0.01 to 2 µm in diameter. Certain high temperature polymer particles may preferably be adapted to keep the electrodes spaced apart or separated at high temperatures given sufficient loading of particles and coating thickness or add.

The preferred water based polymeric binder can be polyvinyl alcohol (PVOH), polyvinyl acetate (PVAc), polyacrylic acid salt, polyacrylonitrile, polyacrylamide or poly (sodium acrylate-acrylamide-acrylonitrile) copolymer or copolymers of the above or blends or mixtures of the above.

The polymeric binder: ceramic particle ratio comprising the coating mixture may be from 1:99 to 99:1.

Methods for coating a microporous polyolefin substrate include any conventional coating manner such as dip coating, gravure coating, spray coating, electrospin or electrospun coating, myer rod dip coating, slot die or extrusion coating, sputtering, vapor deposition, sputtering chemical vapor deposition, or the like. The ceramic coating can be applied to a microporous membrane, substrate or separator membrane as a single or double side coating. At least selected embodiments of the present invention comprise a single or double side ceramic coating that is preferably about 2-12 µm thick, more preferably about 3-10 µm thick, and most preferably 3-7 µm thick. The preferred method is a double side coating.

The possibly preferred inventive ceramic coated microporous separator membrane has improved high temperature stability due to a reduction in the amount of machine direction and transverse direction shrinkage of the membrane at elevated temperatures. The inventive ceramic coated separator membrane was analyzed using a TA Instrument Thermomechanical Analyzer model TMA Q400. In this test method, a sample 5 mm in length and 5.9 mm in width is held under a constant load of 0.02N while the temperature is ramped up at 5° C./min rate until the temperature exceeds the melting point of the sample and the sample ruptures. Typically, as the temperature of a separator membrane sample is increased, the sample initially shows small but a measurable amount of shrinkage followed by elongation of the sample until it eventually breaks or ruptures. The initial shrinkage exhibited by the separator membrane film is defined as strain shrinkage. The temperature at the point of break or rupture of the sample is defined as the rupture temperature.

FIG. 1 shows a thermogram analysis or TMA analysis with the sample in the MD direction for inventive examples Ex 1 through Ex 5, together with the comparative examples CE 1 and CE 2. TMA data for the ceramic coated samples Ex 1, Ex 2 and Ex 3 shows a marked reduction in the amount of MD strain shrinkage for the ceramic coated PE samples between 90 and 130 deg C. as compared to the uncoated CE 1 control. Inventive Ex 4, a ceramic coated PP/PE/PP trilayer membrane Celgard C-210, also shows a reduction in the amount for strain shrinkage compared to the uncoated control sample CE 2. Furthermore, the MD strain shrinkage of Ex 5, a monolayer PP ceramic coated microporous membrane is reduced. The inventive ceramic coating produces a reduction in the amount of MD strain shrinkage of the PE, PP and multilayer microporous separator membranes containing PP and PE at temperatures between 90 and 130 deg C.

At a temperature of 130 deg C., the TMA MD direction shrinkage of Ex 1 through Ex 5 is shown to be <2%. Furthermore, at 140 deg C., the TMA MD direction strain shrinkage of ceramic coated PE microporous membrane shown in Ex 1, Ex 2 and Ex 3 is <2%. Furthermore, at 150 deg C., the TMA MD direction strain shrinkage of ceramic coated PE microporous membrane Ex 1, Ex 2 and Ex 3 is <2%. Furthermore, at 160 deg C., the TMA MD direction strain shrinkage of ceramic coated PE microporous membrane Ex 2 and Ex 3 is <2%.

Furthermore, the TMA test results in the MD direction shows that a total ceramic coating thickness of 5-6 um (see Ex 2 in FIG. 1) when applied as a double sided coating to the PE membrane is sufficient to prevent the ceramic coated PE separator membrane from melting up to 250 deg C.

Figure 2:
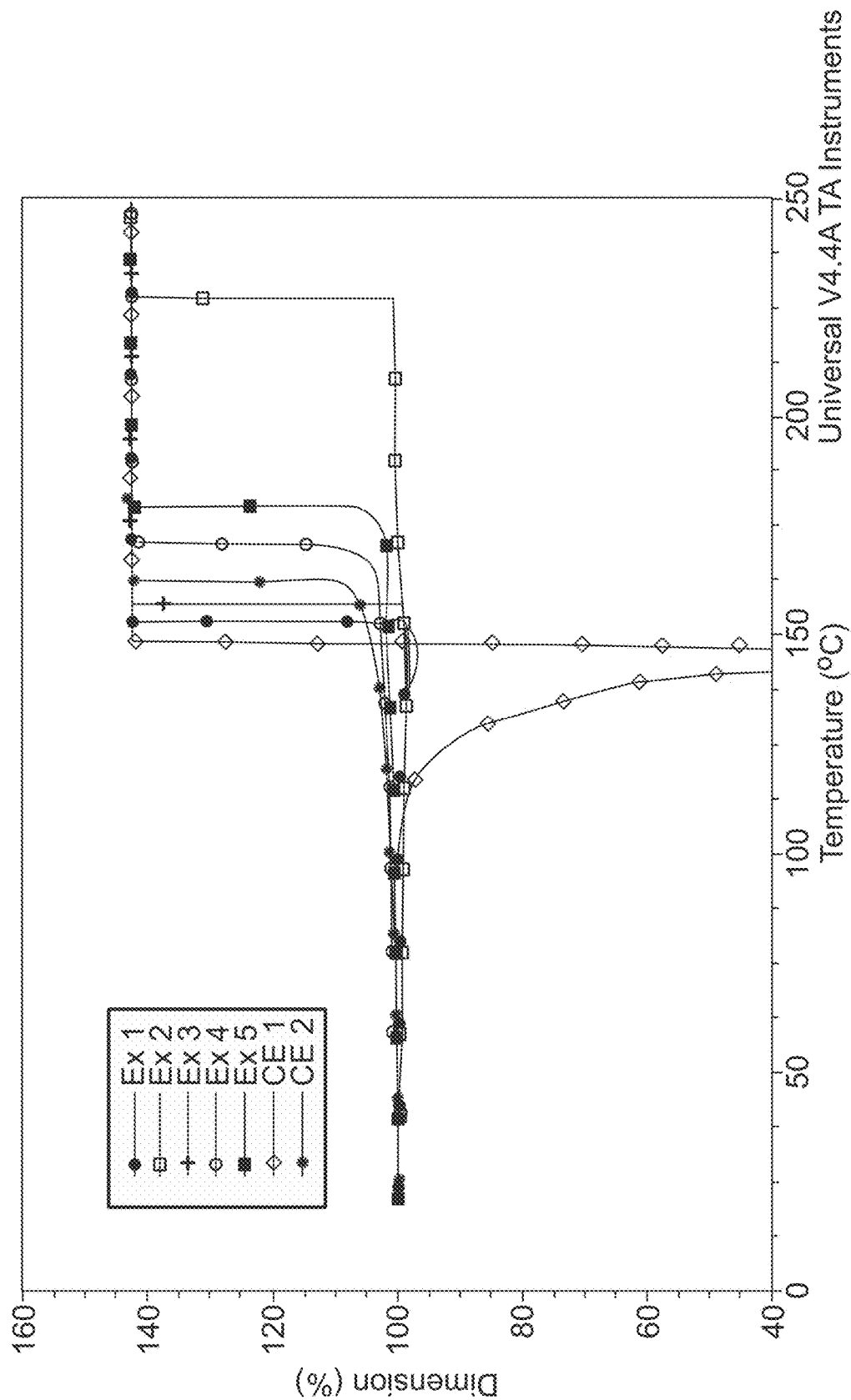
FIG. 2 is a Thermomechanical Analysis (TMA) thermogram representation of Inventive Examples Ex 1 through Ex 4 and Comparative samples CE 1 and CE 2 with testing performed in the Transverse Direction (TD) of the membrane.

FIG. 2 shows TMA test results in the transverse direction (TD) on samples Ex 1 through Ex 5 and Comparative examples CE 1 and CE 2. The inventive ceramic coating has a very low TD strain shrinkage of <1%. Ex 2 has high temperature stability up to a temperature of 225 deg C.

One preferred beneficial effect of the inventive ceramic coated battery separator membrane in a lithium ion battery is improved safety performance at high temperatures.

A minimal amount of MD and TD strain shrinkage of the separator at elevated temperatures may be a key factor in maintaining an insulating, electrically nonconductive barrier to prevent any contact between the battery anode and cathode.

Figure 3:
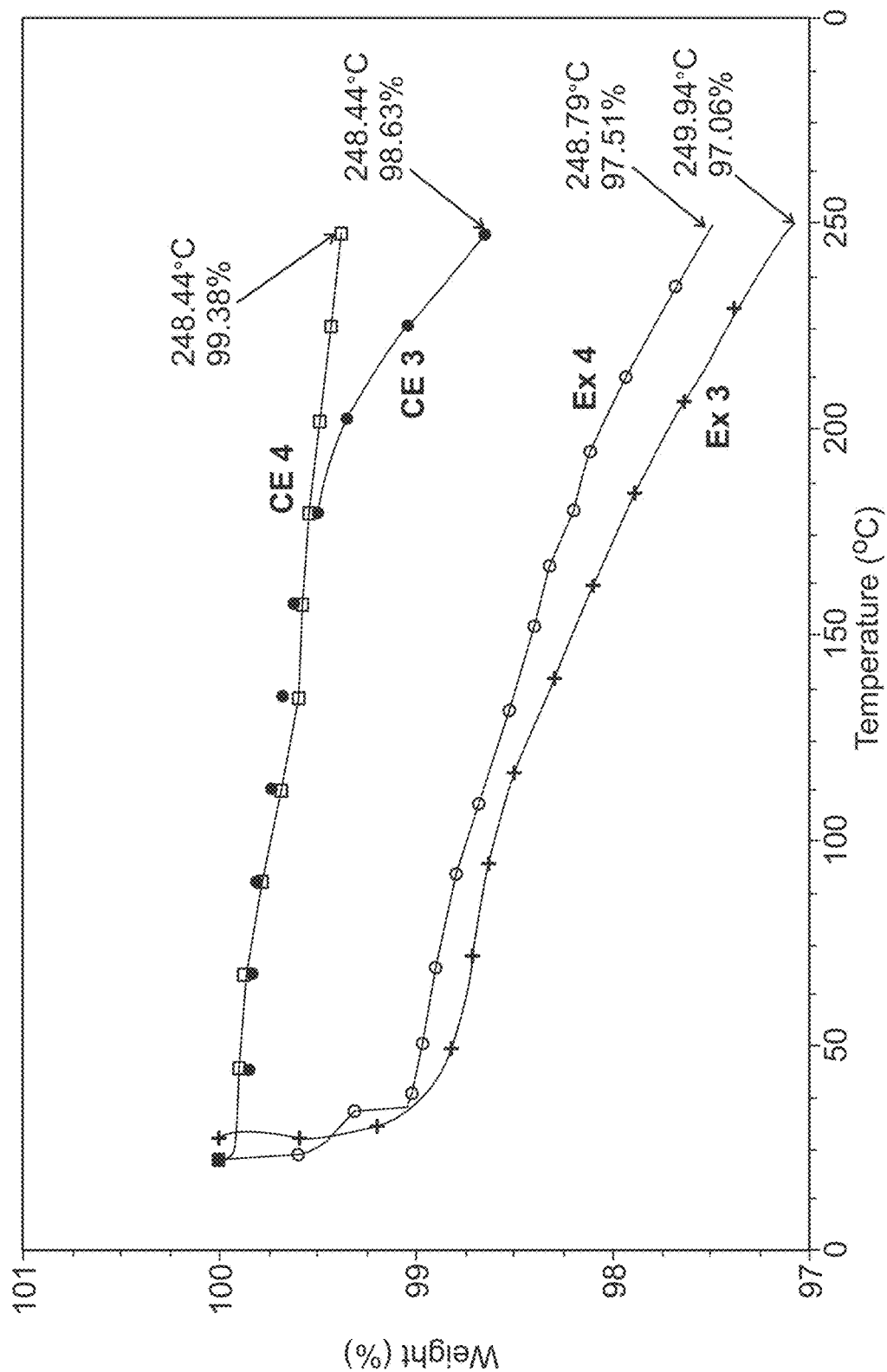
FIG. 3 is a Thermogravimetric Analysis (TGA) thermogram representation of Inventive Examples Ex 3 and Ex 4 and Comparative examples CE 3 and CE 4.

FIG. 3 shows a Thermogravimetric Analysis (TGA) thermogram for the inventive ceramic coated separator membrane Ex 3 and Ex 4 together with comparative patent examples CE 3 and CE 4. TGA analysis of the inventive ceramic coated separator was performed using TA Instruments TGA Q50 model to monitor the change in the mass of the inventive ceramic coated separator membrane as a function of increasing temperature.

TGA is a process that utilizes heat and stoichiometry ratios to determine the percent by mass of a solute in a sample. TGA can quantify loss of volatile components in a test sample.

CE 3 and CE 4 show <1.4% weight loss by a temperature of 250 deg C. In contrast, the inventive ceramic coated separator membrane samples Ex 3 and Ex 4 exhibit a loss of volatile components of >2% by weight at a temperature of 250 deg C. The inventive ceramic coated separator membranes in FIG. 3 were used to make lithium ion batteries that underwent a total of 400 charge/discharge cycles at a temperature of 45 deg C. The ceramic coated separator membrane Ex 3 and Ex 4 were removed from the batteries after the 400 cycle testing and a TGA performed on the ceramic coated separator membranes. Ex 3 and Ex 4 show greater than 90% retention in mass after 400 battery cycles which meets industrial battery cycling standards.

Test Methods

Shrinkage is measured at 120 deg C. for one hour or at 130 deg C. for one hour using modified ASTM 2732-96 procedure. Both the width and length of a sample are measured before and after heat treatment. Samples are placed in an oven in a free state meaning the sample is not placed under tension and the sample is not supported by a tentering frame. The net shrinkage is calculated by the following formula:

$$\% \text{ Net shrinkage} = 100 * (Lo - L1)/(Lo + (Wo - W1/Wo))$$

Where Lo is the length of the sample before treatment, L1 is the length of the sample after treatment, Wo is the width of the sample before treatment and W1 is the width of the sample after treatment.

Gurley is defined as the Japanese Industrial Standard (JIS Gurley) and is a gas permeability test measured using the OHKEN permeability tester. JIS Gurley is the time in seconds required for 100c of air to pass through one square inch of film at a constant pressure of 4.8 inches of water.

Thickness is measured in micrometers, µm, using the Emveco Microgage 210-A micrometer thickness tester and test procedure ASTM D374.

Thermomechanical Analysis (TMA) involves measuring the shape change of a sample under load, while the temperature is linearly increased. TA Instruments TMA Q400 was used for the analysis. The TMA analytical test utilizes a small separator sample 5 mm in length and 5.9 mm in width that is held in mini-Instron type grips. The sample is held under constant tension or load of approximately 0.02N while the temperature is ramped at 5° C./min until the temperature exceeds the melting point of the sample and the sample ruptures at the rupture temperature. Typically as the temperature of a separator membrane sample is increased, the sample initially show some shrinkage and then starts to elongate until the sample eventually breaks or ruptures. The initial shrinkage exhibited by the separator membrane film is defined as strain shrinkage.

Thermogravimetric Analysis (TGA) is a technique in which the mass of a substance is monitored as a function of temperature or time as the sample specimen is subjected to a controlled temperature program in a controlled atmosphere. TA Instruments TGA Q50 model was used for the analysis. TGA is a process that utilizes heat and stoichiometry ratios to determine the percent by mass of a solute contained in a sample. Analysis is carried out by raising the temperature of the sample gradually and plotting weight (percentage) against temperature. TGA can quantify loss of water, loss of solvent, loss of plasticizer, decarboxylation, pyrolysis, oxidation, decomposition, weight % filler, amount of metallic catalytic residue remaining on carbon nanotubes, and weight % ash.

In accordance with at least selected embodiments, it may be preferred to use Thin or Ultra-Thin separators, Thin or Ultra-Thin separators with shutdown, Thin or Ultra-Thin tri-layer separators with shutdown behavior, or the like. In one embodiment, the use of battery separators in the Thin range of about 9 to 12 microns or in the Ultra-Thin range of about 3 to 9 microns which retain the ability to shutdown is preferred. Also, it may be preferred to use a PP/PE/PP tri-layer configuration in which the PP layer thickness is less than 20 microns, less than 10 microns, less than 5 microns, less than 2.5 microns, or between about 0.5 micron and 1.5 microns. In accordance with at least selected particular embodiments, it may be preferred to use a PP/PE/PP or PP/PP/PP or PP/PE/PE or PP/PP/PE tri-layer battery separator construction with product thicknesses ranging from about 6 µm to 80 µm wherein the outermost PP layer thicknesses is less than 20 µm, less than 10 µm, less than 5 µm, less than 2.5 µm, or between about 0.25 µm and 2 µm.

EXAMPLES

Example 1

Celgard® EK1240 Polyethylene (PE) 12 µm microporous separator membrane was coated with a mixture of an aqueous polymeric binder consisting of a copolymer of polysodium acrylate, acrylamide and acrylonitrile combined with Degussa $Al_2O_3$ ceramic particles with average particle size is <2 um. The coating was double side coated with total coating thickness of 4 um. The final coated membrane thickness was 16 µm as shown in Table 1.

TABLE 1

| Example # | Base membrane | Base membrane thickness, µm | Coated Membrane Manufacturer | Coated Membrane thickness, µm |
| --- | --- | --- | --- | --- |
| Ex 1 | Celgard® EK1240 | 12 | Celgard | 16 |
| Ex 2 | Celgard® EK1240 | 12 | Celgard | 18 |
| Ex 3 | Celgard® EK1311 | 13 | Celgard | 20 |
| Ex 4 | Celgard® C-210 | 16 | Celgard | 22 |
| Ex 5 | Celgard® A273 | 18 | Celgard | 22 |
| CE1 | Celgard® EK1240 | 12 | uncoated | na |
| CE 2 | Celgard® C210 | 16 | uncoated | na |
| CE 3 | Celgard® 2320 | 16 | Company A | 28 |
| CE 4 | Monolayer PE | 26 | Company B | 33 |

Example 2

Celgard® EK1240 Polyethylene (PE) 12 µm microporous separator membrane was coated with a mixture of an aqueous polymeric binder consisting of a copolymer of polysodium acrylate, acrylamide and acrylonitrile combined with Degussa $Al_2O_3$ ceramic particles with average particle size is <2 um. The coating was double side coated with total coating thickness of 6 um. Final coated membrane thickness was 18 µm.

Example 3

Celgard® EK1311 Polyethylene (PE) 13 µm microporous separator membrane was coated with a mixture of an aqueous polymeric binder consisting of a copolymer of polysodium acrylate, acrylamide and acrylonitrile combined with Degussa $Al_2O_3$ ceramic particles with average particle size is <2 µm. The coating was double side coated with total coating thickness of 7 um. Final coated membrane thickness was 20 µm.

Example 4

Celgard® C210 Polypropylene/Polyethylene/Polypropylene (PP/PE/PP) 16 µm trilayer microporous separator membrane was coated with a mixture of an aqueous polymeric binder consisting of a copolymer of polysodium acrylate, acrylamide and acrylonitrile combined with Degussa $Al_2O_3$ ceramic particles with average particle size is <2 µm. The coating was double side coated with total coating thickness of 6 um. Final coated membrane thickness was 22 µm.

Example 5

Celgard® A273 Polypropylene (PP) 16 µm microporous separator membrane was coated with a mixture of an aqueous polymeric binder consisting of a copolymer of polysodium acrylate, acrylamide and acrylonitrile combined with Degussa $Al_2O_3$ ceramic particles with average particle size is <2 µm. The coating was double side coated with total coating thickness of 6 um. Final coated membrane thickness was 22 µm.

Comparative Example 1

Celgard® EK1240, manufactured by Celgard Korea Inc, is a 12 µm thick uncoated monolayer Polyethylene (PE) microporous separator membrane.

Comparative Example 2

Celgard® C-210 is a 16 µm thick uncoated trilayer Polypropylene/Polyethylene/Polypropylene (PP/PE/PP) microporous separator membrane.

Comparative Example 3

Comparative Example 3 is a coated product manufactured by Company A using Celgard® 2320 as the microporous base substrate membrane. The coating consists of a mixture of ceramic particles and a polymeric binder which is double side coated with a coating thickness of 33.5 µm.

Comparative Example 4

Comparative Example 4 is a PE microporous separator membrane manufactured by Company B which is single side coated with a mixture of a ceramic particles and a polymeric binder and has a coating thickness of 33 µm.

At least one embodiment, object or aspect of the present invention is directed to an improved, new or modified microporous membrane separator for a secondary lithium ion battery which includes a microporous membrane coated with a porous layer of ceramic particles and a polymeric binder. This inventive ceramic coated microporous separator membrane has improved safety and high temperature performance in a secondary lithium ion battery mainly due to the ceramic coating layer undergoing an oxidation or reduction reaction at the interface of the coated separator and battery electrodes. The formation of an oxidized or reduced interfacial layer between a separator and battery electrodes prevents or stops further oxidation or reduction reactions from occurring and improves the safety and the high temperature performance of a lithium ion battery. In addition, the safety and high temperature performance of the ceramic coated microporous separator membrane is improved due to its high dimensional stability at elevated temperatures. Furthermore, this unique ceramic coated microporous separator membrane evolves >2% volatile components at >250 deg C.

At least one embodiment, object or aspect of the present invention is directed to a ceramic coated separator for a secondary lithium ion battery, comprising:

a. a microporous membrane having a first surface and a second surface, wherein said microporous membrane is at least one of a single layer, multiple layer, single ply, and/or multiple ply structure; and, b. a porous ceramic coating on at least one surface of said microporous membrane, said porous ceramic coating comprising a porous layer of ceramic particles in an aqueous polymeric binder, and wherein said porous ceramic coating provides an oxidation scavenging layer which prevents or stops further oxidation or reduction reactions from occurring during use.

In accordance with at least selected embodiments, objects or aspects of the present invention, there is provided improved, new or modified membranes, separators, and/or related methods. In accordance with at least certain embodiments, the present invention is directed to improved, new or modified nonporous, porous, or microporous battery separator membranes or separators and/or related methods of manufacture and/or use of such membranes or separators. In accordance with at least selected embodiments, the present invention is directed to improved, new or modified nonporous, porous, or microporous battery separator membranes or separators for lithium ion batteries and/or related methods of manufacture and/or use of such membranes or separators.

In accordance with at least selected particular embodiments, the present invention is directed to improved, new or modified nonporous, porous, or microporous battery separator membranes or separators for secondary or rechargeable lithium ion batteries and/or related methods of manufacture and/or use of such membranes or separators. In accordance with at least certain selected particular embodiments, the present invention is directed to nonporous, porous, or microporous coated porous or microporous battery separator membranes or separators for secondary lithium ion batteries and/or related methods of manufacture and/or use of such membranes or separators. In accordance with at least one embodiment, an improved, new or modified nonporous, porous, or microporous membrane, separator membrane or separator for a lithium ion battery includes a porous or microporous membrane coated with a ceramic coating or layer such as a layer of one or more particles and/or binders. In accordance with at least one particular embodiment, an improved, new or modified nonporous, porous, or microporous membrane, separator membrane or separator for a secondary lithium ion battery includes a microporous membrane coated with at least one porous ceramic coating or layer such as a layer of one or more ceramic particles and polymeric binders. In accordance with at least selected embodiments, the inventive ceramic coated separator membrane or separator preferably provides improved safety, cycle life and/or high temperature performance in a secondary lithium ion battery.

In accordance with selected objects, improved, new or modified membranes, separators, and/or related methods are provided. In accordance with at least certain objects, improved, new or modified battery separator membranes or separators and/or related methods of manufacture and/or use of such membranes or separators are provided. In accordance with at least certain selected particular objects, coated battery separator membranes or separators for secondary lithium ion batteries and/or related methods of manufacture and/or use of such membranes or separators are provided.

In a further aspect, methods of making improved, new or modified membranes, separators, and/or related products are described herein. One method of making a coated membrane or separator, in some embodiments, comprises dispersing inorganic particles in a polymeric matrix or binder material to provide a composite coating or layer material and forming the coating or layer on a preformed base membrane or separator from the composite coating material.

The membrane or separator can be formed in any manner not inconsistent with the objectives of the present invention, including in a manner described above. In some embodiments, for instance, a composite membrane or separator may be formed by lamination, extrusion, co-extrusion, spray coating, roller coating, dry extrusion, wet extrusion, and/or the like. Any extrusion equipment not inconsistent with the objectives of the present invention may be used to carry out such a method described herein. In some cases, for example, a single or twin-screw extruder is used. In addition, if desired, the base membrane described herein can be formed using a die process, including a slot or annular die process, cast or blown, or the like.

In addition, any amount of particles, inorganic particles, organic particles, or a blend or mixture thereof not inconsistent with the objectives of the present invention may be used to provide the desired coating material or layer. In some cases, up to about 98 weight percent inorganic and/or organic particles, up to about 80 weight percent inorganic and/or organic particles, up to about 60 weight percent inorganic and/or organic particles, up to about 50 weight percent inorganic and/or organic particles, or up to about 40 weight percent inorganic and/or organic particles is used to provide the particle component for the coating material, wherein the weight percent is based on the total weight of the composite coating material.

A composite membrane produced in accordance with methods described herein can have any construction and/or properties detailed above. For example, in some embodiments, a composite membrane produced in accordance with methods described herein comprises a plurality of polymeric layers, wherein at least one layer comprises a microporous polymeric matrix comprising inorganic and/or organic particles dispersed in the polymeric matrix or binder as described herein. In some embodiments, more than one individual layer of the composite membrane comprises inorganic and/or organic particles. Alternatively, in other embodiments, only one individual layer of the composite membrane comprises inorganic and/or organic particles.

In accordance with at least selected possibly preferred embodiments of the invention, there is provided a ceramic coated separator for an energy storage device, such as a secondary lithium ion battery, comprising:
 a. a microporous membrane having a first surface and a second surface, wherein said microporous membrane is at least one of a single layer, multiple layer, single ply, and/or multiple ply structure; and,
 b. a ceramic coating on at least one surface of said microporous membrane, said ceramic coating comprising a porous layer of ceramic particles in an aqueous polymeric binder,
wherein said ceramic coated separator provides at least one of improved safety, high temperature performance, an oxidation or reduction reaction interface, surface or boundary, an oxidized or reduced interfacial layer between the separator and battery electrodes during use, prevents or stops further oxidation or reduction reactions from occurring during use, improved safety and high temperature performance of a lithium ion battery, high dimensional stability at elevated temperatures, and/or the like.

The above ceramic coated separator, wherein said aqueous polymeric binder comprises at least one of polytetrafluoroethylene (PTFE), polyvinyl acetate (PVAc), polyacrylic acid salt, polyacrylonitrile, polyacrylamide or poly (sodium acrylate-acrylamide-acrylonitrile) copolymer, and/or copolymers, mixtures, blends, and/or combinations thereof.

The above ceramic coated separator, wherein said aqueous polymeric binder comprises at least two of polyvinyl alcohol (PVOH), polyvinyl acetate (PVAc), polyacrylic acid salt, polyacrylonitrile, polyacrylamide or poly (sodium acrylate-acrylamide-acrylonitrile) copolymer or copolymers thereof.

The above ceramic coated separator, wherein said ceramic particles comprise at least one of inorganic particles, ionically conductive materials (beta-Alumina, Nasicon which is a sodium super ionic conductive material, phosphates of Silica and Al), oxides of silicon ($SiO_2$), alumina ($Al_2O_3$), zirconium, titanium ($TiO_2$), mixtures thereof, or nitrides of silicon, alumina, zirconium, calcium, or mixtures thereof, and/or mixtures, blends and/or combinations thereof.

The above ceramic coated separator, wherein said ceramic particles comprise particles having an average particle size ranging from 0.01 µm to 5 µm in diameter, more preferably 0.05 µm to 4 µm in diameter, and most preferably 0.01 µm to 2 µm in diameter.

The above ceramic coated separator, wherein said ceramic particles comprise $Al_2O_3$ having an average particle size ranging from 0.01 µm to 5 µm in diameter, more preferably 0.05 µm to 4 µm in diameter, and most preferably 0.05 µm to 2 µm in diameter.

The above ceramic coated separator, wherein said porous ceramic coating on at least one surface of said microporous membrane has a thickness of about 1.5 µm to 5.5 um.

The above ceramic coated separator, wherein said porous ceramic coating on at least one surface of said microporous membrane has a thickness of about 1.5 µm to 5.5 µm, and wherein said ceramic coated separator has a TMA MD dimensional change of −2% or more at ≤110 deg C., preferably at ≤130 deg C., more preferably at ≤140 deg C., even more preferably at ≤160 deg C., and most preferably at ≤175 deg C.

The above ceramic coated separator, wherein said ceramic coated separator has a TMA TD shrinkage of about 0.5% or less ≤130 deg C., preferably at ≤140 deg C., more preferably at ≤150 deg C., and most preferably at ≤160 deg C.

The above ceramic coated separator, wherein said porous ceramic coating on at least one surface of said microporous membrane has a thickness of about 3.0 µm to 5.5 µm, and wherein said ceramic coated separator has an MD shrinkage of 15% or less at 135 deg C. for one hour, and preferably an MD shrinkage of 28% or less at 150 deg C. for one hour.

The above ceramic coated separator, wherein said microporous membrane is a wet process polyethylene microporous membrane, wherein said porous ceramic coating on at least one surface of said microporous membrane has a thickness of about 3.0 µm to 5.5 µm, and wherein said ceramic coated separator has an MD shrinkage of 2% or less at 135 deg C. for one hour, and preferably an MD shrinkage of 5% or less at 150 deg C. for one hour.

The above ceramic coated separator, wherein said porous ceramic coating on at least one surface of said microporous membrane has a thickness of about 3.0 µm to 5.5 µm, and wherein said ceramic coated separator has a reduction in MD shrinkage at 135 deg C. for one hour of at least 40% over the uncoated membrane, preferably a reduction in MD shrinkage at 150 deg C. for one hour of at least 30% over the uncoated membrane.

The above ceramic coated separator, wherein said microporous membrane is a wet process polyethylene microporous membrane, wherein said porous ceramic coating on at least one surface of said microporous membrane has a thickness of about 3.0 µm to 5.5 µm, and wherein said ceramic coated separator has a reduction in MD shrinkage at 135 deg C. for one hour of at least 10% over the uncoated membrane, preferably a reduction in MD shrinkage at 150 deg C. for one hour of at least 5% over the uncoated membrane.

The above ceramic coated separator, wherein said porous ceramic coating on at least one surface of said microporous membrane has a thickness of about 5.5 µm to 9.0 µm, and wherein said ceramic coated separator has an MD shrinkage of 4% or less at 135 deg C. for one hour, and preferably an MD shrinkage of 5% or less at 150 deg C. for one hour.

The above ceramic coated separator, wherein said microporous membrane is a wet process polyethylene microporous membrane, wherein said porous ceramic coating on at least one surface of said microporous membrane has a thickness of about 5.5 µm to 9.0 µm, and wherein said ceramic coated separator has an MD shrinkage of 2% or less at 135 deg C. for one hour, and preferably an MD shrinkage of 2% or less at 150 deg C. for one hour.

The above ceramic coated separator, wherein said porous ceramic coating on at least one surface of said microporous membrane has a thickness of about 5.5 µm to 9.0 µm, and wherein said ceramic coated separator has a reduction in MD shrinkage at 135 deg C. for one hour of at least 80% over the uncoated membrane, preferably a reduction in MD shrinkage at 150 deg C. for one hour of at least 60% over the uncoated membrane.

The above ceramic coated separator, wherein said microporous membrane is a wet process polyethylene microporous membrane, wherein said porous ceramic coating on at least one surface of said microporous membrane has a thickness of about 5.5 µm to 9.0 µm, and wherein said ceramic coated separator has a reduction in MD shrinkage at 135 deg C. for one hour of at least 90% over the uncoated membrane, preferably a reduction in MD shrinkage at 150 deg C. for one hour of at least 70% over the uncoated membrane.

The above ceramic coated separator, wherein said ceramic coated separator having aqueous binder and a scavenging filler such as Al2O3 evolves ≥0.5% volatile components at >250 deg C., preferably >1.0% volatile components at ≥250 deg C., more preferably >1.5% volatile components at >250 deg C., and most preferably ≥2.0% volatile components at >250 deg C.

The above ceramic coated separator, wherein said ceramic coated separator has a strain shrinkage of 0% at >120 deg C., preferably at >130 deg C., more preferably at >140 deg C., still more preferably at >150 deg C., and most preferably at ≥160 deg C.

The above ceramic coated separator, wherein said microporous membrane is a polyolefinic microporous membrane and has an MD stretch of less than 20% at >120 deg C., preferably less than 15% at >120 deg C., more preferably less than 10% at >120 deg C., still more preferably less than 5% at >120 deg C., and most preferably less than 2% at >120 deg C.

In accordance with at least certain possibly preferred embodiments of the invention, there is provided in a secondary lithium ion battery, the improvement comprising the ceramic coated separators described above.

In accordance with at least certain possibly preferred embodiments of the invention, there is provided in an electric vehicle drive system, the improvement comprising the above secondary lithium ion battery.

In accordance with at least certain possibly preferred embodiments of the invention, there is provided in an energy storage device, the improvement comprising the above secondary lithium ion battery.

In accordance with at least certain selected possibly preferred embodiments of the invention, there is provided a ceramic coated separator for a secondary lithium ion battery, comprising:
  c. a microporous membrane having a first surface and a second surface, wherein said microporous membrane is at least one of a single layer, multiple layer, single ply, and/or multiple ply structure; and,
  d. a porous ceramic coating on at least one surface of said microporous membrane, said porous ceramic coating comprising a porous layer of ceramic particles in an aqueous polymeric binder, and wherein said porous ceramic coating provides an oxidation scavenging layer which prevents or stops further oxidation or reduction reactions from occurring during use.

The above ceramic coated separator, wherein said ceramic coated separator evolves >0.5% volatile components at ≥250 deg C., preferably >1.0% volatile components at ≥250 deg C., more preferably >1.5% volatile components at ≥250 deg C., and most preferably >2.0% or more volatile components at ≥250 deg C.

The above ceramic coated separator, wherein said microporous membrane is an Ultra-Thin tri-layer separator with shutdown behavior and is in the Ultra-Thin range of about 3 to 9 microns with the ability to shut down.

In accordance with at least selected embodiments of the invention, there is provided a coated, particle coated or ceramic coated separator for a secondary lithium ion battery, comprising:
  a. a microporous membrane having a first surface and a second surface, wherein said microporous membrane is at least one of a single layer, multiple layer, single ply, and/or multiple ply structure; and,
  b. a non-porous or porous coating, particle coating or ceramic coating on at least one surface of said microporous membrane, said coating, particle coating or ceramic coating comprising a non-porous or porous layer of polymeric binder, of particles in a polymeric binder, or of ceramic particles in a solvent based or aqueous based polymeric binder. Such a non-porous coating can still be ionically conductive if, for example, the binder swells and gels in electrolyte and is effectively ionically conductive due to the electrolyte, the particles are ionically conductive at least on their exterior surface, or both.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A ceramic-coated battery separator, comprising:
a microporous polyolefin membrane having a first surface and a second surface,
said microporous membrane has a single layer or a multiple layer structure; and
a ceramic coating on at least one surface of said microporous polyolefin membrane,
said ceramic coating comprising a layer of ceramic particles in a polymeric binder,
said polymeric binder comprises polyacrylamide, poly (sodium acrylate-acrylamide-acrylonitrile) copolymer, or a combination thereof;
wherein said ceramic coated separator contains a scavenging filler; and
wherein said ceramic coated separator having each of the following physical characteristics:
a TMA MD dimensional change of −2% or more at ≤110° C.;
a TMA TD shrinkage of about 0.5% or less at ≤130° C.;
a MD shrinkage of 15% or less at 135° C. for one hour;
an evolution of >2% volatile components at 250° C. when tested using Thermogravimetric Analysis (TGA); and
a strain shrinkage of 0% at ≥120° C.

2. The ceramic-coated separator of claim 1, wherein the ceramic-coated separator exhibits the Machine Direction (MD) shrinkage of <2% at a temperature greater than or equal to 120° C. for one hour when tested in free state and the MD shrinkage of <3% at a temperature greater than or equal to 130° C. for one hour when tested in free state.

3. The ceramic-coated separator of claim 1, wherein the ceramic-coated separator exhibits the MD shrinkage of <1% at a temperature greater than or equal to 150° C. when tested using Thermomechanical Analysis (TMA).

4. The ceramic-coated separator of claim 1, wherein the ceramic-coated separator exhibits the transverse direction (TD) shrinkage of <1% at a temperature greater than or equal to 150° C. when tested using e-TMA.

5. The ceramic-coated separator of claim 1, wherein the microporous membrane is a membrane formed by a dry process or a wet process.

6. The ceramic-coated separator of claim 1, wherein the ceramic coating comprises $Al_2O_3$.

7. The ceramic-coated separator of claim 1, wherein the ceramic coating has a thickness of 2 to 12 microns, 3 to 10 microns, or 3 to 7 microns.

8. The ceramic-coated separator of claim 1, wherein the polymeric binder comprises polyacrylamide.

9. The ceramic-coated separator of claim 1, wherein the polymeric binder comprises poly (sodium acrylate-acrylamide-acrylonitrile) copolymer.

10. The ceramic-coated separator of claim 1, wherein the ceramic particles have an average particle size ranging from 0.01 microns to 5 microns.

11. The ceramic-coated separator of claim 10, wherein the average particle size of the ceramic particles is from 0.05 microns to 2 microns.

12. The ceramic-coated separator of claim 1, further comprising
- a particle coating, which comprises polymer particles selected from the group consisting of polymer fibers, polymer beads, or polymer chips,
- wherein the polymer fibers, polymer beads, and/or polymer chips comprise PP, PE, PO, PP/PE, PET, PTFE, PVDF, copolymers, block copolymers, or blends or mixtures thereof.

* * * * *